United States Patent
Miyazaki et al.

(10) Patent No.: US 10,367,225 B2
(45) Date of Patent: Jul. 30, 2019

(54) POWER STORAGE DEVICE

(71) Applicant: Panasonic Intellectual Property Management Co., Ltd., Osaka-shi, Osaka (JP)

(72) Inventors: Shinya Miyazaki, Hyogo (JP); Kazunori Donoue, Hyogo (JP); Hiroki Watanabe, Hyogo (JP)

(73) Assignee: PANASONIC INTELLECTUAL PROPERTY MANAGEMENT CO., L', Osaka (JP)

( * ) Notice: Subject to any disclaimer, the term of this patent is extended or adjusted under 35 U.S.C. 154(b) by 0 days.

(21) Appl. No.: 15/749,684

(22) PCT Filed: Aug. 8, 2016

(86) PCT No.: PCT/JP2016/003639
§ 371 (c)(1),
(2) Date: Feb. 1, 2018

(87) PCT Pub. No.: WO2017/033420
PCT Pub. Date: Mar. 2, 2017

(65) Prior Publication Data
US 2018/0233771 A1    Aug. 16, 2018

(30) Foreign Application Priority Data
Aug. 26, 2015    (JP) .................. 2015-166677

(51) Int. Cl.
*H01M 2/26*    (2006.01)
*H01M 10/0525*    (2010.01)
(Continued)

(52) U.S. Cl.
CPC ........ *H01M 10/0525* (2013.01); *H01G 11/82* (2013.01); *H01M 2/021* (2013.01);
(Continued)

(58) Field of Classification Search
CPC .................................... H01M 2/266
See application file for complete search history.

(56) References Cited

U.S. PATENT DOCUMENTS

2013/0052510 A1* 2/2013 Miyazaki .............. H01M 2/08
429/156
2013/0059179 A1 3/2013 Hosaka et al.

FOREIGN PATENT DOCUMENTS

JP    2008-91099 A    4/2008
JP    2014-7103 A    1/2014
(Continued)

OTHER PUBLICATIONS

International Search Report dated Nov. 8, 2016, issued in counterpart International Application No. PCT/JP2016/003639 (1 page).

*Primary Examiner* — Eli S Mekhlin
(74) *Attorney, Agent, or Firm* — Westerman, Hattori, Daniels & Adrian, LLP (57) ABSTRACT

A power storage device includes a stacked electrode assembly in which a plurality of pairs of electrodes are stacked and a fixing tape which is placed astride both end portions of the stacked electrode assembly in an electrode-stacking direction and which includes a pair of bonded sections each bonded to a corresponding one of the end portions thereof and an intermediate section connecting the bonded sections together. The intermediate section of the fixing tape includes a base portion extending along a side surface of the stacked electrode assembly and a clearance portion projecting in a direction away from the side surface of the stacked electrode assembly and tape surfaces facing each other in the clearance portion are separably bonded to each other.

8 Claims, 4 Drawing Sheets

(51) Int. Cl.
*H01G 11/82* (2013.01)
*H01M 10/0585* (2010.01)
*H01M 4/134* (2010.01)
*H01M 4/66* (2006.01)
*H01M 2/02* (2006.01)
*H01M 4/38* (2006.01)
*H01M 10/04* (2006.01)
*H01M 4/02* (2006.01)

(52) U.S. Cl.
CPC ....... *H01M 2/0212* (2013.01); *H01M 2/0287* (2013.01); *H01M 2/266* (2013.01); *H01M 4/134* (2013.01); *H01M 4/386* (2013.01); *H01M 4/661* (2013.01); *H01M 10/0413* (2013.01); *H01M 10/0436* (2013.01); *H01M 10/0468* (2013.01); *H01M 10/0585* (2013.01); *H01M 2004/027* (2013.01); *H01M 2004/028* (2013.01)

(56) References Cited

FOREIGN PATENT DOCUMENTS

| | | |
|---|---|---|
| JP | 2014-93128 A | 5/2014 |
| WO | 2011/145608 A1 | 11/2011 |

* cited by examiner

POWER STORAGE DEVICE

TECHNICAL FIELD

The present disclosure relates to a power storage device.

BACKGROUND ART

A known power storage device includes a stacked electrode assembly formed by stacking a plurality of pairs of electrodes. An example of the power storage device is a lithium ion battery which includes a plurality of positive electrodes, a plurality of negative electrodes, and a plurality of separators and in which the positive electrodes and the negative electrodes are alternately stacked with the separators therebetween. In the case where a so-called stacked electrode structure is used in the lithium ion battery, the stress due to the expansion or contraction of electrodes during charge or discharge is likely to be uniformly generated in an electrode-stacking direction; the strain of an electrode assembly can be reduced as compared to, for example, a wound electrode structure; and the homogenization of a battery reaction, the life extension of a battery, and the like are likely to be achieved.

In the stacked electrode structure, a unit for holding a stacked structure needs to be placed for the purpose of preventing the displacement of an electrode due to vibration. For example, Patent Literature 1 discloses a lithium ion battery in which each of support sheets is placed on a corresponding one of both end surfaces of a stacked electrode assembly in a stacking direction and in which at least two displacement-preventing tapes are attached to each support, sheet so as to be astride the stacked electrode assembly.

CITATION LIST

Patent Literature

PTL 1: Japanese Published Unexamined Patent Application No. 2008-91099

SUMMARY OF INVENTION

Technical Problem

However, in the battery disclosed in Patent Literature 1, a large stress is likely to be generated because the expansion of electrodes due to charge or discharge is prevented at portions having the displacement-preventing tapes attached thereto and the vicinity thereof. Therefore, the deterioration of the battery proceeds from tape-attached spots to reduce the life of the battery in some cases.

Solution to Problem

A power storage device according to an aspect of the present disclosure includes a stacked electrode assembly in which a plurality of pairs of electrodes are stacked and a fixing tape which is placed astride both end portions of the stacked electrode assembly in an electrode-stacking direction and which includes a pair of bonded sections each bonded to a corresponding one of the end portions thereof and an intermediate section connecting the bonded sections together. The intermediate section of the fixing tape includes a base portion extending along a side surface of the stacked electrode assembly and a clearance portion projecting in a direction away from the side surface of the stacked electrode assembly and tape surfaces facing each other in the clearance portion are separably bonded to each other.

Advantageous Effects of Invention

According to an aspect of the present disclosure, the following device can be provided: a power storage device which can prevent the displacement of stacked electrodes in a stacked electrode assembly and in which the concentration of stress due to the change in volume of the electrodes during charge or discharge is unlikely to occur. That is, in accordance with the power storage device according to the aspect of the present disclosure, the structure of the stacked electrode assembly can be maintained stable and the deterioration of performance due to the concentration of the above stress can be sufficiently reduced.

DESCRIPTION OF EMBODIMENTS

A power storage device which is an example of an embodiment is described below in detail.

Drawings referred to in embodiments are those illustrated schematically and the dimensional ratio and the like of objects depicted in the drawings are different from those of actual objects in some cases. The specific dimensional ratio and the like of objects should be determined with the following description taken into consideration. In this specification, the term "approximately **" is intended to include completely the same things and those regarded as substantially the same, as described using the term "approximately the same" as an example. The term "end portion" refers to an end of an object and the vicinity thereof.

A battery 10 (laminated type battery) including an enclosure 11 composed of two laminate films 12 and 13 is exemplified below as an example of an embodiment. The power storage device according to the present disclosure is not limited to the battery 10. The power storage device according to the present disclosure may be a laminated type battery including, for example, two laminate films each having a body portion housing a stacked electrode assembly or a battery including a metal case which serves as an enclosure and which has a prismatic shape, a coin shape, a button shape, or the like. Alternatively, the power storage device according to the present disclosure may be a capacitor.

In this embodiment, fixing tapes 30 each including an adhesive layer 32 are exemplified. The fixing tapes may have a configuration having no adhesive layer 32. Each of the fixing tapes may be composed of, for example, a tape base 31 only. In this case, the fixing tapes are, for example, heat-welded or solvent-welded to a stacked electrode assembly. Tape surfaces of clearance portions of the fixing tapes can be welded to each other. For example, heat welding is a method for bonding the tape base 31 in such a manner that the tape base 31 is softened and melted by heating. Solvent welding is a method for bonding the tape base 31 in such a manner that the tape base 31 is dissolved with an organic solvent or the like.

The battery 10, which is an example of this embodiment, is described below in detail with reference to FIGS. 1 to 4.

Figure 1:
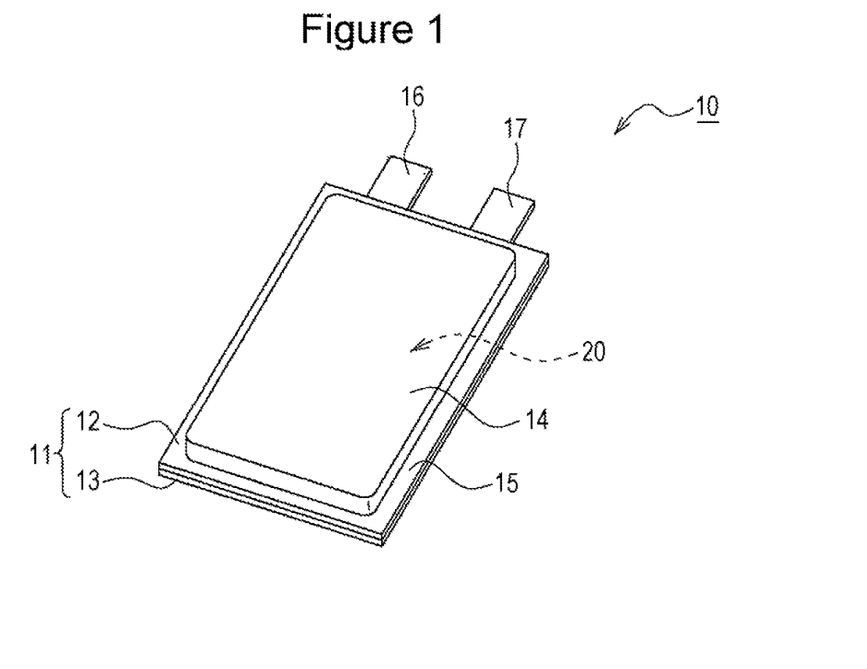
FIG. 1 is an outline perspective view of a power storage device that is an example of an embodiment.
Figure 2:
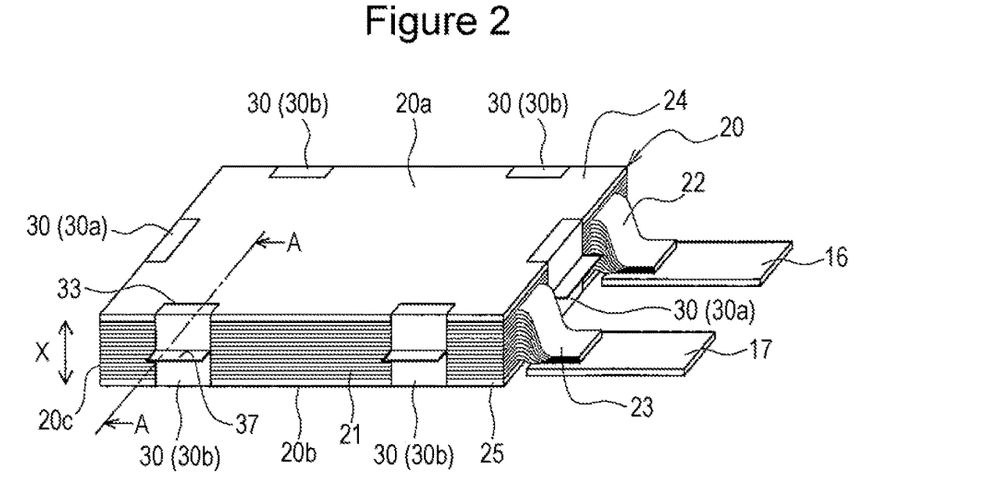
FIG. 2 is a perspective view of a stacked electrode assembly that is an example of an embodiment.

FIG. 1 is an outline perspective view of the battery 10. FIG. 2 is a perspective view of a stacked electrode assembly 20 housed in the enclosure 11. For convenience of illustration, descriptions below are based on the assumption that the resin sheet 24 side is an upper side and the resin sheet 25 side is a lower side.

As shown in FIGS. 1 and 2, the battery 10 includes the stacked electrode assembly 20, in which a plurality of pairs of electrodes are stacked. The stacked electrode assembly 20 includes, for example, a plurality of positive electrodes containing a lithium composite oxide, a plurality of negative electrodes storing and releasing lithium ions, and a plurality of separators and has a structure in which the positive electrodes and the negative electrodes are stacked with the separators therebetween. The separators used are porous sheets having ionic permeability and insulating properties. The stacked electrode assembly 20 has a so-called stacked electrode structure. The number of the stacked positive electrodes is, for example, 10 to 70. A preferable example of the battery 10 is a lithium ion battery and includes the stacked electrode assembly 20 and a nonaqueous electrolyte as power-generating components. In this embodiment, the power-generating components are housed in the enclosure 11, which is composed of the two laminate films 12 and 13. Incidentally, the stacked electrode assembly can be prepared in such a manner that a single elongated separator is folded in a zigzag pattern and the positive electrodes and the negative electrodes are alternately interposed between folded portions.

The battery 10 includes the fixing tapes 30, which are described below in detail. The fixing tapes 30 are placed astride the upper surface 20a and lower surface 20b of the stacked electrode assembly 20 that are located at both end portions of the stacked electrode assembly 20 in an electrode-stacking direction X. Each fixing tape 30 includes a pair of bonded sections 33 and 34 bonded to the upper surface 20a and lower surface 20b, respectively, of the stacked electrode assembly 20 and an intermediate section 35 connecting the bonded sections 33 and 34 together. The intermediate section 35 includes base portions 36 extending along a side surface 20c of the stacked electrode assembly 20 and a clearance portion 37 projecting in a direction away from the side surface 20c of the stacked electrode assembly 20. In the fixing tape 30, tape surfaces facing each other in the clearance portion 37 are separably bonded to each other. Using the fixing tape 30, which includes the clearance portion 37, enables the concentration of stress in an electrode assembly due to the change in volume of electrodes during charge or discharge to be sufficiently reduced and also enables the displacement of stacked electrodes to be prevented.

The stacked electrode assembly 20 preferably includes a pair of resin sheets 24 and 25 each placed on a corresponding one of both end portions in the electrode-stacking direction X (refer to FIG. 2). That is, the stacked electrode assembly 20 is composed of an electrode group 21 including the positive electrodes, the negative electrodes, and the separators and a pair of the resin sheets 24 and 25. The resin sheets 24 and 25 vertically sandwich the electrode group 21. The positive electrodes or the negative electrodes are generally placed at an upper end portion and lower end portion of the electrode group 21. In this embodiment, a sheet surface of each of the resin sheets 24 and 25 that faces opposite to the electrode group 21 is a corresponding one of the upper surface 20a and lower surface 20b of the stacked electrode assembly 20.

The positive electrodes, the negative electrodes, and the separators, which form the electrode group 21, have, for example, substantially a rectangular shape in plan view. The resin sheets 24 and 25 have, for example, substantially a rectangular shape in plan view. The electrode group 21, which is formed by stacking them, and the stacked electrode assembly 20 have substantially a rectangular parallelepiped shape. Each positive electrode is provided with a positive electrode lead 22. Each negative electrode is provided with a negative electrode lead 23. In this embodiment, the positive electrode lead 22 and the negative electrode lead 23 extend front the single side surface 20c, which is located at a longitudinal end of the stacked electrode assembly 20 (electrode group 21), which has substantially the rectangular parallelepiped shape. The side surface 20c is a wall of the stacked electrode assembly 20 that extends along the electrode-stacking direction X (the thickness direction of the stacked electrode assembly 20 or the electrode group 21).

The positive electrode leads 22 extend from one lateral end side of the single side surface 20c and are stacked in the electrode-stacking direction X. The negative electrode leads 23, as well as the positive electrode leads 22, extend from the other lateral end side of the side surface 20c and are stacked in the electrode-stacking direction X. Each of a stack of the positive electrode leads 22 and a stack of the negative electrode leads 23 is connected to a corresponding one of electrode terminals (a positive electrode terminal 16 and a negative electrode terminal 17) by, for example, ultrasonic welding or the like.

The resin sheets 24 and 25 have, for example, the function of protecting the electrode group 21. The stacked electrode assembly 20 may have a configuration having none of the resin sheets 24 and 25. In this case, for example, the fixing tape 30 is attached to electrodes. In the case where the fixing tape 30 is attached to the electrodes, it is conceivable that the electrodes are broken when the fixing tape 30 is pulled by the change in volume of the stacked electrode assembly 20 during charge or discharge. Such a failure can be prevented by using the resin sheets 24 and 25.

The resin sheets 24 and 25 have a size sufficient to entirely cover the upper surface and lower surface, respectively, of the electrode group 21 and preferably have substantially the same sheet area as the area of each of the upper and lower surfaces of the electrode group 21. In general, the upper and lower surfaces of the electrode group 21 have substantially the same area. The resin sheets 24 and 25 used may be, for example, resin films, resistant to electrolyte solutions, having a thickness of about 20 μm to 50 μm. In particular, films made of an olefinic resin in which ethylene units or propylene units are main constitutional units, a fluorinated resin such as polytetrafluoroethylene, or the like are cited. The resin sheets 24 and 25 may include the same members as the separators. In a stacked electrode assembly prepared by folding a single elongated separator in a zigzag pattern as described above, both end portions of the elongated separator can be used as the resin sheets 24 and 25.

Each positive electrode is composed of, for example, a positive electrode current collector and positive electrode mix layers formed on the current collector. The positive electrode current collector used may be foil of a metal, such as aluminium, stable in the potential range of the positive electrode; a film including a surface layer made of the metal; or the like. The positive electrode lead 22 is formed by extending a portion of the positive electrode current collector and is integral with the current collector. It is preferable that the positive electrode mix layers contain a positive electrode active material, a conductive agent, and a binding agent and are placed on both surfaces of the current collector. The positive electrode can be prepared in such a manner that, for example, positive electrode mix slurry containing the positive electrode active material, the conductive agent, and the binding agent is applied to the positive electrode current collector and wet films are dried and are then rolled such that the positive electrode mix layers are formed on both surfaces of the current collector.

The positive electrode active material used is, for example, a lithium composite oxide. The lithium composite oxide is not particularly limited and is preferably a composite oxide represented by the general formula $Li_{1-x}M_aO_{2+b}$ (where x+a=1, $-0.2<x\leq0.2$, $-0.1\leq b\leq0.1$, and M includes at least one of Ni, Co, Mn, and Al). A preferable example of the composite oxide is a lithium composite oxide containing Ni, Co, and Mn or a lithium composite oxide containing Ni, Co, and Al.

Each negative electrode is composed of, for example, a negative electrode current collector and negative electrode mix layers formed on the current collector. The negative electrode current collector used may be foil of a metal, such as copper, stable in the potential range of the negative electrode; a film including a surface layer made of the metal; or the like. The negative electrode lead 23 is formed by extending a portion of the negative electrode current collector and is integral with the current collector. The negative electrode mix layers preferably contain a negative electrode active material and a binding agent. The negative electrode can be prepared in such a manner that, for example, negative electrode mix slurry containing the negative electrode active material and the binding agent is applied to the negative electrode current collector and wet films are dried and are then rolled such that the negative electrode mix layers are formed on both surfaces of the current collector.

The negative electrode active material used may be a material capable of storing and releasing lithium ions and is generally graphite. The negative electrode active material used may be silicon, a silicon compound, or a mixture thereof. The silicon compound and/or the like may be used in combination with a carbon material such as graphite. Since the silicon compound, and the like can store a larger number of lithium ions as compared to the carbon material, such as graphite, applying these materials to the negative electrode active material enables batteries to have high energy density. A preferable example of the silicon compound is a silicon oxide represented by $SiO_x$ ($0.5\leq x\leq1.5$). The surface of each of $SiO_x$ particles is preferably covered by a conductive coating of amorphous carbon or the like. In the case of using the silicon compound and/or the like, the effect of using the fixing tape 30 as described above appears more significantly because the change in volume of the negative electrodes during charge or discharge is large.

The nonaqueous electrolyte contains a nonaqueous solvent and an electrolyte salt dissolved in the nonaqueous solvent. The nonaqueous electrolyte is not limited to any liquid electrolyte and may be a solid electrolyte containing a gelled polymer or the like. For the nonaqueous solvent, for example, esters, ethers nitriles, amides, solvent mixtures of these compounds, and the like can foe used. The nonaqueous solvent may contain a halogen substituted compound obtained by substituting hydrogen in at least one of these solvents with an atom of a halogen such as fluorine. The electrolyte salt is preferably a lithium salt.

The battery 10 includes the enclosure 11, which is composed of the two laminate films 12 and 13, as described above. The enclosure 11 has, for example, substantially a rectangular shape in plan view. In the battery 10, the enclosure 11, which houses the stacked electrode assembly 20, is flexible. Therefore, the effect of using the fixing tape 30 as described above is likely to appear because the stacked electrode assembly 20 is more likely to expand as compared to power storage devices equipped with a metal case. The laminate films 12 and 13 used are preferably films each including a metal layer and resin layers formed on both surfaces thereof. The metal layer is, for example, a thin film of aluminium and has the function of preventing the transmission of moisture.

The enclosure 11 includes a body portion 14 with a flat-shape and a sealed portion 15 formed by bonding the edges of the laminate films 12 and 13 to each other. The power-generating components (the stacked electrode assembly 20 and the nonaqueous electrolyte) of the battery 10 are housed in the body portion 14. In an example shown in FIG. 1, the laminate film 12 has the body portion 14. The body portion 14 is flat and is substantially rectangular parallelepiped shaped. The body portion 14 is formed in such a manner that, for example, the laminate film 12 is drawn so as to be convex opposite to the laminate film 13, which is placed opposite to the laminate film 12. The sealed portion 15 is formed around the body portion 14 by heat-sealing, for example, the edges of the laminate films 12 and 13.

In this embodiment, a pair of electrode terminals (the positive electrode terminal 16 and the negative electrode terminal 17) are routed out of a longitudinal end of the enclosure 11. Each electrode terminal is bonded to the laminate films 12 and 13 at the sealed portion 15 and is routed out of the enclosure 11 from between the films through the sealed portion 15. In the enclosure 11, the positive electrode leads 22 are connected to the positive electrode terminal 16 and the negative electrode leads 23 are connected to the negative electrode terminal 17. A pair of the electrode terminals may be routed in opposite directions.

The fixing tape 30 is described below in detail with appropriate reference to FIGS. 2 to 4.

Figure 3:
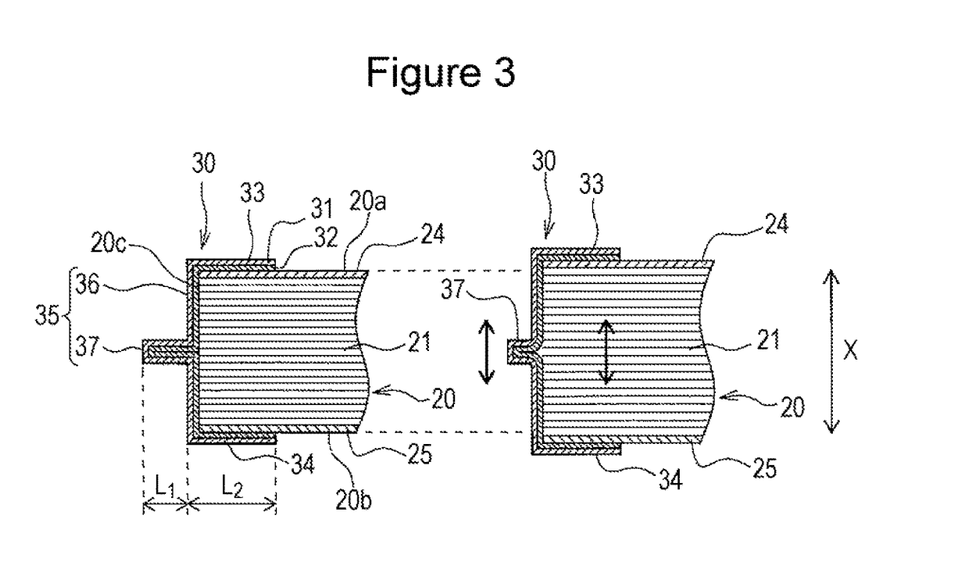
FIG. 3 is a sectional view taken along the line A-A of FIG. 2.

FIG. 3 is a sectional view taken along the line A-A of FIG. 2. FIG. 4 is an illustration showing the state of the fixing tape 30 housed in the enclosure 11.

As shown in FIGS. 2 and 3, the fixing tape 30 is placed astride the upper surface 20a and lower surface 20b of the stacked electrode assembly 20. The fixing tape 30 includes, for example, an end section (the bonded section 33) attached to an end portion of the upper surface 20a, an intermediate section (the intermediate section 35) extending along the side surface 20c in the electrode-stacking direction X, and another end section (the bonded section 34) attached to an end portion of the lower surface 20b. The fixing tape 30 binds the stacked electrode assembly 20 (the electrode group 21) in the electrode-stacking direction X and has the function of preventing the displacement of the stacked electrodes, which form the electrode group 21.

The fixing tape 30 may be attached to at least the upper surface 20a and lower surface 20b of the stacked electrode assembly 20 and need not be attached to the side surface 20c thereof. In this embodiment, since a sheet surface of the resin sheet 24 is the upper surface 20a of the stacked electrode assembly 20 and a sheet surface of the resin sheet 25 is the lower surface 20b thereof, it can be said that the fixing tape 30 is placed astride the resin sheets 24 and 25. It is preferable that the fixing tapes 30 are plurally arranged as described below.

Each fixing tape 30 includes the bonded section 33, which is attached to the upper surface 20a of the stacked electrode assembly 20, the bonded section 34, which is attached to the lower surface 20b thereof, and the intermediate section 35, which connects the bonded section 33 and the bonded section 34 together. The length (hereinafter referred to as "length ($L_{35}$)) of the intermediate section 35 along a direction in which the bonded section 33, the intermediate section 35, and the bonded section 34 are arranged is larger than the length (hereinafter referred to as "thickness ($T_{20}$)) of the stacked electrode assembly 20 along the electrode-stacking direction X. In such a state that the thickness ($T_{20}$) of the stacked electrode assembly 20 is not increased, that is, before charge, the clearance portion 37, which is a surplus portion, is present in the intermediate section 35. Incidentally, the length ($L_{35}$) of the intermediate section 35 means the length thereof when the clearance portion 37 is completely extended.

In other words, both longitudinal end portions (the bonded sections 33 and 34) of the fixing tape 30 are attached to the upper surface 20a and the lower surface 20b in such a manner that the clearance portion 37 is formed such that the length ($L_{35}$) of the intermediate section 35 is larger than the thickness ($T_{20}$) of the stacked electrode assembly 20. Incidentally, after a portion corresponding to the clearance portion 37 is formed in the intermediate section 35, the fixing tape 30 may be attached to the stacked electrode assembly 20. Details of the intermediate section 35 are described below.

The fixing tape 30 preferably includes the tape base 31 and the adhesive layer 32, which is placed on the tape base 31. The fixing tape 30 (the tape base 31) is, for example, a strip-like body that is long in the direction in which the bonded section 33, the intermediate section 35, and the bonded section 34 are arranged and that has substantially a constant width along the direction and is attached to the stacked electrode assembly 20 in such a state that a longitudinal direction thereof is along the electrode-stacking direction X. The adhesive layer 32 may be placed on a portion of the tape base 31 (refer to, for example, FIG. 5 below). In this embodiment, the adhesive layer 32 is placed over a surface of the tape base 31. In descriptions below, a tape surface provided with the adhesive layer 32 or a surface of the tape base 31 is referred to as "back surface" in some cases.

The tape base 31 used is not particularly limited and is preferably a film having good electrolyte solution resistance. As the preferably tape base 31, a film made of an olefinic resin in which ethylene units or propylene units are main constitutional units, an imide resin, or the like can be exemplified. The thickness of the tape base 31 is, for example, 10 μm to 150 μm.

The adhesive layer 32 is formed by applying, for example, an adhesive to the tape base 31. The adhesive, which makes up the adhesive layer 32, is not particularly limited and may be an adhesive having good electrolyte solution resistance. The adhesive used may be a pressure-sensitive adhesive having stickiness at room temperature (25° C.), a heat-sensitive adhesive exhibiting stickiness by heating, or the like. From the viewpoint of productivity, the pressure-sensitive adhesive is preferably used. The thickness of the adhesive layer 32 is, for example, 10 μm to 100 μm.

At least two or more of the fixing tapes 30 are preferably placed. Each fixing tape 30 is preferably placed opposite to another fixing tape 30. The fixing tapes 30 are placed on, for example, both longitudinal end portions of the stacked electrode assembly 20, which has substantially a rectangular parallelepiped shape, and are also placed on both lateral end portions thereof. In an example shown in FIG. 2, one of the fixing tapes 30 is placed on each of the longitudinal end portions of the stacked electrode assembly 20 and two of the fixing tapes 30 are placed on each of the lateral end portions thereof, that is, the number of the fixing tapes 30 is six in total (in FIG. 2, the former are represented by reference numeral 30a and the latter are represented by reference numeral 30b). The fixing tapes 30 are arranged opposite to each other in a longitudinal direction and lateral direction of the stacked electrode assembly 20. Multiple (in the example shown in FIG. 2, three) pairs of the fixing tapes 30 are arranged opposite to each other.

Each of the two fixing tapes 30a is attached to, for example, a corresponding one of lateral central portions of the stacked electrode assembly 20 in the longitudinal end portions of the stacked electrode assembly 20. The fixing tapes 30a attached to along the side surface 20c of the stacked electrode assembly 20 that has a pair of the electrode terminals extending therefrom are located between the positive electrode leads 22 and the negative electrode leads 23. Two of the fixing tapes 30b are attached to each lateral end portion of the stacked electrode assembly 20 with a space therebetween. One of the two fixing tapes 30b is attached to, for example, about an intermediate between the longitudinal center of the stacked electrode assembly 20 and one longitudinal end thereof. Likewise, the either of the fixing tapes 30b is attached to, for example, about an intermediate between the longitudinal center of the stacked electrode assembly 20 and the other longitudinal end thereof.

The number and arrangement of the fixing tapes 30, the shape and size of each tape, and the like are not limited to those described above. In the example shown in FIG. 2, all of the fixing tapes 30 have the same shape and size. The tapes may be different in shape or size. The fixing tapes 30 may have such a shape that the direction in which the bonded section 33, the intermediate section 35, and the bonded section 34 are arranged is a width direction a direction perpendicular to the above direction is a longitudinal direction. The tapes may be attached only to both width direction end portions of the stacked electrode assembly 20.

The intermediate section 35 includes the base portions 36, which extend along the side surface 20c of the stacked electrode assembly 20, and the clearance portion 37, which projects in the direction (outside the stacked electrode assembly 20) away from the side surface 20c thereof as described above and tape back surfaces that face each other in the clearance portion 37 are separably bonded to each other. Referring to FIGS. 2 and 3, the base portions 36 are in direct contact with the side surface 20c without being bent and the clearance portion 37 stands substantially perpendicularly to the side surface 20c. The base of the clearance portion 37 is substantially in contact with the side surface 20c.

The clearance portion 37 is a portion in which portions of the intermediate section 35 that are longer than the thickness ($T_{20}$) of the stacked electrode assembly 20, that is, portions that are surplus before charge or discharge are superimposed in such a state that back surfaces of the fixing tape 30 provided with the adhesive layer 32 are in contact with each other. That is, the clearance portion 37 is a portion in which the back surfaces of the fixing tape 30 are in contact with each other and are doubled. The tape back surfaces facing each other in the clearance portion 37 are bonded to each other with the adhesive layer 32 therebetween. The clearance portion 37 is preferably formed by superimposing all of the portions longer than the thickness ($T_{20}$) of the stacked electrode assembly 20. This allows the base portions 36 to be formed in the intermediate section 35 such that the base portions 36 are in direct contact with the side surface 20c without being bent. The tape back surfaces facing each other over the length of the clearance portion 37 are in direct contact with the clearance portion 37, which stands on the side surface 20c, without, for example, being bent or wrinkled.

The clearance portion 37 is placed at substantially an equal distance from, for example, the bonded sections 33 and 34. That is, the clearance portion 37 is placed at substantially the vertical center of the intermediate section 35 and the base portions 36, which have substantially the same vertical length, are placed on the top and bottom of the clearance portion 37. When the clearance portion 37 is placed at substantially an equal distance from the bonded sections 33 and 34, tensile force described below is likely to act on, for example, bonded surfaces of the clearance portion 37 and delamination properties of the bonded surfaces are increased.

Since the fixing tape 30 includes the base portions 36 and the clearance portion 37, the fixing tape 30 reduces the concentration of stress at a tape-attached spot and prevents the displacement of the stacked electrodes when the thickness ($T_{20}$) of the stacked electrode assembly 20 is increased due to the charge or discharge of the battery 10. Of course, the fixing tape 30 prevents the displacement of the stacked electrodes before charge or discharge.

The right side of FIG. 3 shows such a state that the thickness ($T_{20}$) of the stacked electrode assembly 20 is increased. When the thickness ($T_{20}$) of the stacked electrode assembly 20 is increased, tensile force acts vertically on the intermediate section 35. This separates the bonded surfaces of the clearance portion 37 that are formed by bringing the tape back surfaces into contact with each other, whereby tapes are paid out from the clearance portion 37. That is, the projecting length $L_1$ of the clearance portion 37 is reduced and the vertical length of the base portion 36 is increased. Since a necessary length is paid out from the clearance portion 37 depending on the increase in thickness ($T_{20}$) of the stacked electrode assembly 20, such a state that the base portion 36 is in direct contact with the side surface 20c of the stacked electrode assembly 20 without bending the base portion 36 is maintained. That is, increasing the length of the base portion 36 along the side surface 20c depending on the increase in thickness ($T_{20}$) of the stacked electrode assembly 20 enables the concentration of stress at the tape-attached spot to be reduced with the binding force to prevent the displacement of the stacked electrodes maintained.

The bonded surfaces of the clearance portion 37 are more likely to be separated by the increase in thickness ($T_{20}$) of the stacked electrode assembly 20 as compared to bonded surfaces of the bonded sections 33 and 34 that are bonded to the resin sheets 24 and 25. When the thickness ($T_{20}$) is increased, tensile force acts vertically on the intermediate section 35. The tensile force is likely to propagate from the base side (side surface 20c side) of the clearance portion 37 toward the tip side thereof. Therefore, the bonded surfaces of the clearance portion 37 are relatively readily separated by the increase of thickness ($T_{20}$). However, no large force acts on the bonded surfaces of the bonded sections 33 and 34 because the intermediate section 35 expands with the increase of the thickness ($T_{20}$). Since most of the force acting on the bonded sections 33 and 34 is force along the upper surface 20a and the lower surface 20b, the bonded surfaces thereof are unlikely to be separated even though the thickness ($T_{20}$) is increased. In other words, the clearance portion 37 has a role in suppressing the separation of the fixing tape 30 due to the increase of the thickness ($T_{20}$).

The bonded surfaces of the clearance portion 37 are separated by the increase in thickness ($T_{20}$) of the stacked electrode assembly 20 as described above. The fixing tape 30 may have a configuration for further facilitating the separation of the bonded surfaces thereof. For example, the bonding force of the clearance portion 37 may be reduced in such a manner that the area or thickness of the adhesive layer 32 or the type of the adhesive, which makes up the adhesive layer 32, is varied between the bonded sections 33 and 34 and the clearance portion 37. For example, the bonding force per unit area of the bonded surfaces of the bonded sections 33 and 34 is set to be greater than the bonding force per unit area of the bonded surfaces of the clearance portion 37. In particular, the adhesive layer 32 may be formed over the back surfaces of the bonded sections 33 and 34 and may be partly formed in the clearance portion 37 in a striped pattern (streaky pattern), a grid pattern, a dotted pattern, or the like.

In this embodiment, the bonding area ($A_1$) between the tape surfaces of the clearance portion 37 is less than the bonding area ($A_2$) between each of the bonded sections 33 and 34 and a corresponding one of the upper surface 20a and lower surface 20b of the stacked electrode assembly 20. Since the bonding area ($A_1$) is less than the bonding area ($A_2$), the clearance portion 37 is likely to be further preferentially separated when the thickness ($T_{20}$) of the stacked electrode assembly 20 is increased. Since the adhesive layer 32 is placed over the back surface of the fixing tape 30 and the fixing tape 30 has a constant width over the entire length thereof, the projecting length $L_1$ of the clearance portion 37 is less than the length $L_2$ (the length along a direction parallel to a direction in which the clearance portion 37 extends) of the bonded sections 33 and 34.

Figure 4:
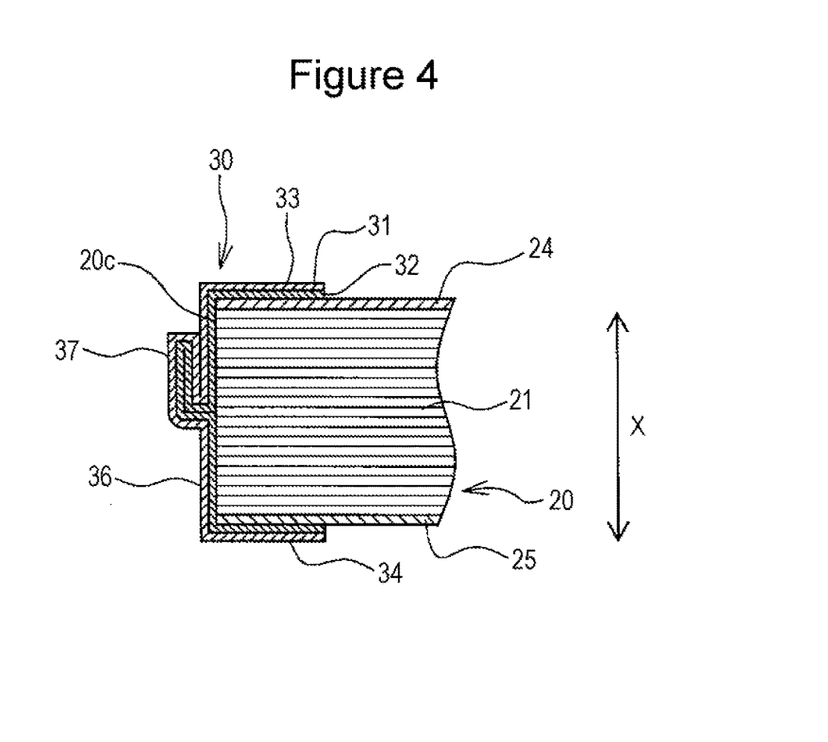
FIG. 4 is an illustration showing the state of a fixing tape housed in an enclosure.

As shown in FIG. 4, in the enclosure 11, the clearance portion 37 extends vertically in such a state that the clearance portion 37 is substantially in contact with, for example, the base portion 36. FIGS. 2 and 3 show such a state that the clearance portion 37 stands substantially perpendicularly to the side surface 20c of the stacked electrode assembly 20. In a portion in which the distance between the enclosure 11 and the side surface 20c is small, the clearance portion 37 is pushed by the enclosure 11 and is, therefore, bent upward or downward. In an example shown in FIG. 4, the whole of the clearance portion 37 is bent upward from the base thereof. For example, only a tip portion of the clearance portion 37 may be bent. Even in such a state that the clearance portion 37 is bent, the above-mentioned effect that the concentration of stress at the tape-attached spot is reduced with the binding force to prevent the displacement of the stacked electrodes maintained is obtained.

Fixing tapes 30A, 30B, and 30C which are other examples of a fixing tape are described below with appropriate reference to FIGS. 5 to 7 with a focus as differences from the above-mentioned fixing tapes 30.

Figure 5:
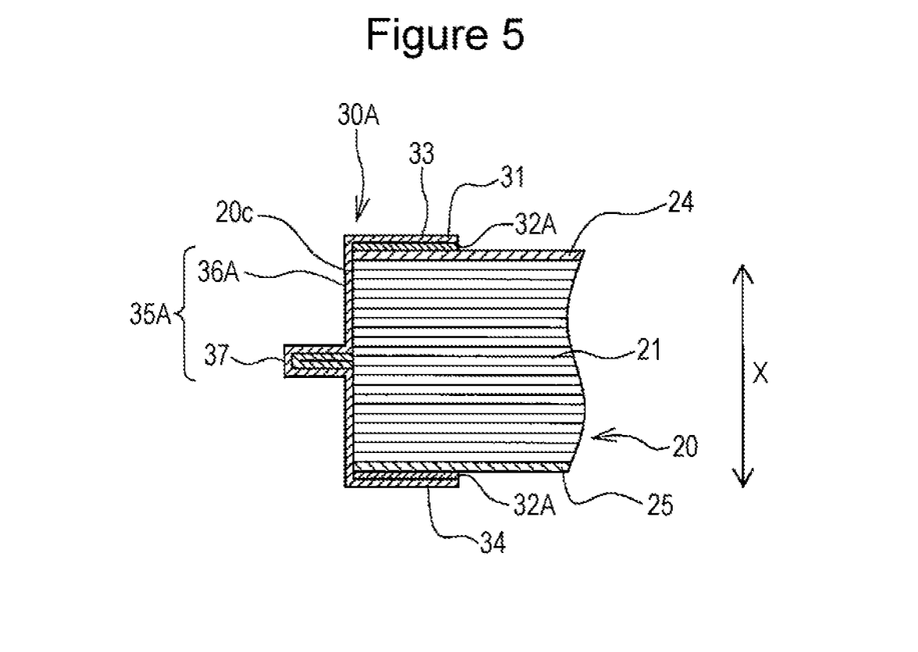
FIG. 5 is an illustration showing another example of a fixing tape.

As shown in FIG. 5, the fixing tape 30A includes adhesive layers 32A placed on portions of the back surface of a tape base 31 that exclude a base portion 36A extending along a side surface 20c of a stacked electrode assembly 20. That is, the fixing tape 30A is different from the fixing tapes 30 in that the adhesive layers 32A are placed only on bonded sections 33 and 34 and a clearance portion 37 and are not present on the base portion 36A and the base portion 36A is not attached to the side surface 20c of the stacked electrode assembly 20. In the case of using the fixing tape 30A, there are advantages that, for example, the operation of attaching a tape to the stacked electrode assembly 20 is easy and bonded surfaces of the clearance portion 37 are readily separated because the force applied to the bonded surfaces thereof is large when the thickness of the stacked electrode assembly 20 is increased.

Figure 6:
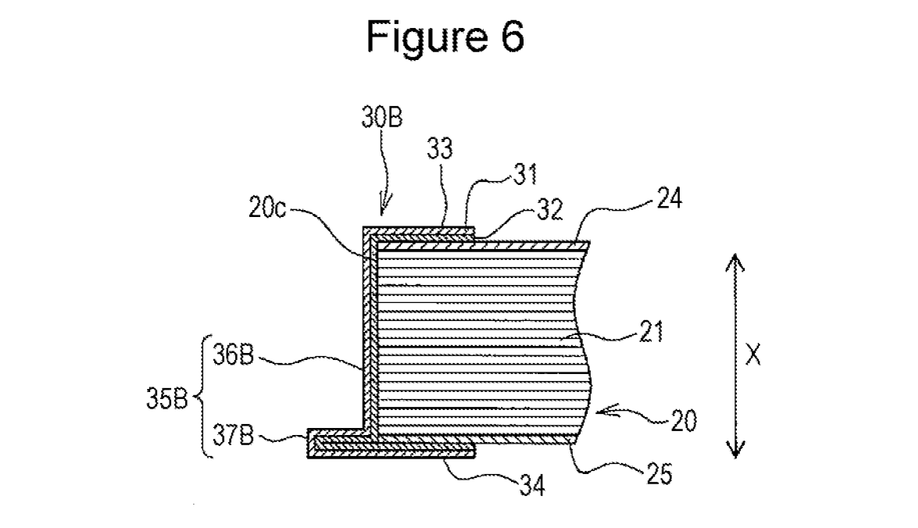
FIG. 6 is an illustration showing still another example of a fixing tape.

As shown in FIG. 6, the fixing tape 30B is different from the fixing tapes 30 in that the fixing tape 30B includes a clearance portion 37B disproportionately placed on the bonded section 34 side. In the fixing tape 30B, a base portion 36B continuously extends from the upper end of a side surface 20c of a stacked electrode assembly 20 to the vicinity of the lower end thereof and is in direct contact with the side surface 20c. In each fixing tape 30, the base portions 36 are placed on the top and bottom of the clearance portion 37. In the fixing tape 30B, the base portion 36B is placed only on the clearance portion 37B.

Figure 7:
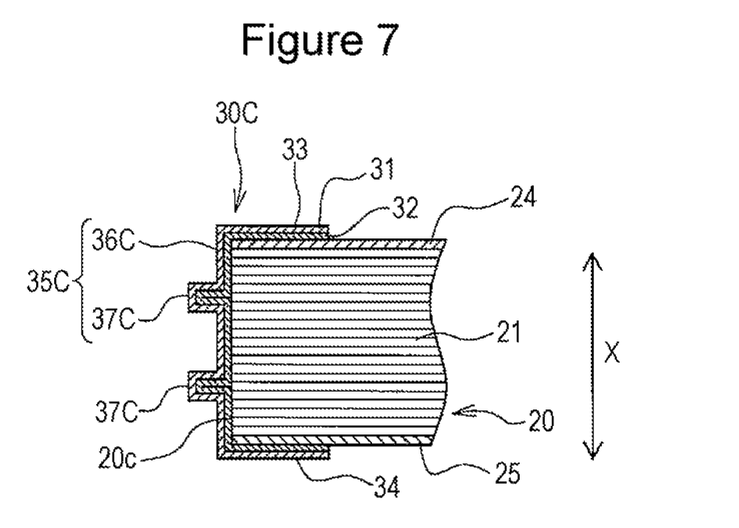
FIG. 7 is an illustration showing still another example of a fixing tape.

As shown in FIG. 7, the fixing tape 30C is different from the fixing tapes 30 in that the fixing tape 30C includes two clearance portions 37C. Incidentally, three or more clearance portions 37C may be formed. In the case where the two clearance portions 37C are formed, the projecting length of each clearance portion 37C may be smaller as compared to the case where the number of clearance portions is, for example, one. In the fixing tape 30C, one of the clearance portions 37C is placed at substantially an equal distance from the vertical center of an intermediate section 35C and a bonded section 33 and the other clearance portion 37C is placed at substantially an equal distance from the vertical center of the intermediate section 35C and a bonded section 34. In the intermediate section 35C, three base portions 36C are placed so as to be separated from each other by the two clearance portions 37C.

INDUSTRIAL APPLICABILITY

The present invention can be used for power storage devices.

REFERENCE SIGNS LIST

10 Battery
11 Enclosure
12 and 13 Laminate films
14 Body portion
15 Sealed portion
16 Positive electrode terminal
17 Negative electrode terminal
20 Stacked: electrode assembly, 20a Upper surface, 20b Lower surface, 20c Side surface
21 Electrode group
22 Positive electrode leads
23 Negative electrode leads
24 and 25 Resin sheets
30 Fixing tapes
31 Tape bases
32 Adhesive layers
33 and 34 Bonded sections
35 Intermediate sections
36 Base portions
37 Clearance portions
X Electrode-stacking direction

The invention claimed is:

1. A power storage device comprising:
a stacked electrode assembly in which a plurality of pairs of electrodes are stacked; and
a fixing tape which is placed astride both end portions of the stacked electrode assembly in an electrode-stacking direction and which includes a pair of bonded sections each bonded to a corresponding one of the end portions thereof and an intermediate section connecting the bonded sections together,
wherein the intermediate section of the fixing tape includes a base portion extending along a side surface of the stacked electrode assembly and a clearance portion projecting in a direction away from the side surface of the stacked electrode assembly and tape surfaces facing each other in the clearance portion are separably bonded to each other.

2. The power storage device according to claim 1, wherein the stacked electrode assembly includes a pair of resin sheets each placed on a corresponding one of both end portions in the electrode-stacking direction and
the fixing tape is one of a plurality of fixing tapes and is placed astride the resin sheets.

3. The power storage device according to claim 1, wherein the bonding area between the tape surfaces in the clearance portion is less than the bonding area between each of the bonded sections and the stacked electrode assembly.

4. The power storage device according to claim 1, wherein the fixing tape includes a tape base and adhesive layers placed on portions of the tape base that exclude the base portion extending along the side surface of the stacked electrode assembly.

5. The power storage device according to claim 1, wherein the clearance portion is placed at substantially an equal distance from the bonded sections.

6. The power storage device according to claim 1, comprising an enclosure housing the stacked electrode assembly, wherein the enclosure is composed of resin sheets including a metal layer.

7. The power storage device according to claim 1, wherein the stacked electrode assembly includes a plurality of positive electrodes containing a lithium composite oxide, a plurality of negative electrodes storing and releasing lithium ions, and a plurality of separators and the positive electrodes and the negative electrodes are stacked with the separators therebetween.

8. The power storage device according to claim 7, wherein the negative electrodes contain silicon, a silicon compound, or a mixture thereof.

* * * * *